Patented Mar. 10, 1936

2,033,481

UNITED STATES PATENT OFFICE 2,033,481

PAPER MANUFACTURE

George A. Richter, Berlin, N. H., assignor to Brown Company, Berlin, N. H., a corporation of Maine No Drawing. Application November 15, 1933, Serial No. 698,126

6 Claims. (Cl. 91—68)

It has been proposed to introduce viscose into paper for the purpose of imparting thereto various desirable qualities, for instance, high wet strength, high wet strength coupled with high water absorbency, and high wet strength coupled with low water absorbency. The use of viscose as a paper-making ingredient, however, gives rise to various troubles. Thus, one serious trouble is the impartation of foul odor to the paper. Another serious trouble arising in the case of white paper is the discoloration of the paper. Accordingly, a marketable paper containing viscose as a paper-making ingredient is had only when the viscose-treated paper is put through suitable after-treatments, all such papers requiring a suitable deodorizing treatment and white paper requiring a suitable bleaching treatment.

After extensive research work with a view toward replacing viscose by a more satisfactory paper-making ingredient, I have found that the cellulose ethers and more particularly the hydroxy ethers of cellulose can be incorporated into paper so as to impart thereto the desirable qualities reached through the use of viscose but without encountering the drawbacks incident to the use of viscose. While various alkyl radicals like methyl, ethyl, propyl, butyl, etc., may enter into the formula of the hydroxy ethers of cellulose used in accordance with my invention, I shall hereinafter speak more specifically about the hydroxy ethyl ether of cellulose not only because this ether can be prepared economically from ethylene oxide and cellulose as raw materials, but because I have found it to be eminently satisfactory for the purpose of my invention. Inasmuch as the mode of preparation of this ether is now known and does not constitute part of the present invention, I need not dwell thereupon. Suffice it to say that the ether can be dissolved in a caustic soda solution and that the resulting solution is sufficiently stable to be kept for a comparatively long period of time without coagulating or gelling.

I have found that when the cellulose ether solution is incorporated into paper or into paper-making stock and the ether precipitated out of solution, it is possible to arrive at papers of high wet strength and otherwise simulating papers treated with viscose. As already indicated, papers so impregnated with cellulose ether possess the important advantage over viscose-treated papers that they are free from odoriferous or coloring contaminations and hence require no after-treatments. Those skilled in the art will appreciate the fact that whereas viscose solutions are colored and give rise to odoriferous sulphur compounds when cellulose is regenerated therefrom, cellulose ether solutions are water white and yield, when treated with suitable precipitants, the colorless cellulose ether unaccompanied by obnoxious or odor-emitting compounds.

The solution of cellulose ether used in accordance with my invention in treating paper at any stage of paper manufacture may be one of the desired caustic soda and cellulose concentration. In this connection, it is to be observed that after cellulose has been etherified in the presence of a suitable catalyzer with ethylene oxide to produce the hydroxy ethyl ether of cellulose the ether may be dissolved in a caustic soda solution of 7% to 8% strength to form a solution of about 8% cellulose ether content. The viscosity of such a solution is fairly high, but it may be reduced as by heating the solution somewhat or by diluting the solution with water of sufficient causticity to keep the ether from precipitating. Once the solution of the ether has been incorporated at the desired concentration and in the desired amount into the paper-making stock or into the paper, the ether may be precipitated from solution by neutralizing the alkali content of the solution as with a suitable acid or acid salt solution, for instance, a solution of sodium bisulphate, alum, etc., that does not decompose the ether itself. The paper containing the precipitated cellulose ether may be glycerinated, soaped, or otherwise treated to acquire enhanced softness, pliancy, and smoothness.

The incorporation of the cellulose ether into the paper may be effected by adding the solution of ether to the paper-making stock and precipitating the ether on the stock before it is delivered to the paper-making machine. In most instances, however, it is preferable and more expedient to treat a pre-fabricated paper sheet with a solution of the ether and with a precipitating reagent, particularly as such practice leads to a finished sheet wherein the precipitated cellulose ether phase has a greater degree of continuity. Assuming that one starts with a pre-fabricated sheet of paper, it is comparatively easy to treat the sheet with the cellulose ether solution in various ways, for instance, by depositing the ether solution as a coating on either or both faces of the sheet through the use of "kissing" rolls or other coating instrumentalities, by passing the sheet through a bath of ether solution and then squeezing the impregnated sheet to the desired solution content, or by spraying the ether solution on either or both faces of the sheet.

After treatment with the ether solution, the paper may be treated in wet or partially dried condition with a suitable precipitant applied as in the form of an aqueous solution of acid or acid salt, as hereinbefore described, or in the form of a suitable acid gas or vapor, such as moist sulphur dioxide. The resulting paper contains not only the pricipitated ether, but also the sodium salt of the acid used as the precipitant. If desired, the salt may be leached out of the paper in a bath of water, preferably hot, but this is not necessary since the salt does not detract appreciably from the qualities sought in the finished paper. It is, of course, possible to perform the treatments of the present invention upon the paper while the paper is pursuing its usual course on the paper-making machine, for instance, while it is traversing the wet end of the paper machine or as it is being delivered from the dry end of the paper-making machine. In some instances, however, the dry paper may be rolled up or accumulated, progressively withdrawn from the roll and put through the treatment with cellulose ether solution, the treatment with precipitant, and, if desired, the treatment with wash water; or the paper may be accumulated after each of these treatments.

The principles of the present invention may be applied in producing papers of various characteristics, for instance, a dense paper made from well beaten paper-making stock and/or body-sized with rosin, wax, or the like, may be coated with a comparatively thick or viscous solution of the ether which remains essentially only on the surface of the paper so that when the coated paper is treated with a suitable precipitant for the ether solution, a film or skin of ether is formed on the surface of the paper. In another instance, a thick solution of the ether may be squeezed or otherwise forced into an absorbent paper in amount sufficient to occupy so much of the pores and voids in the paper as to leave the paper quite unabsorbent once the ether has been precipitated in situ in the pores or voids. Both the foregoing results may be had by starting with the proper kind of paper base and/or by using a cellulose ether solution of comparatively high cellulose ether content, say, about 8%.

A most important sphere of application of my invention is, however, the manufacture of porous and absorptive paper of high wet strength containing an amount of cellulose ether distributed therethrough such as will not detract appreciably from the absorptive paper base used as the starting material and yet such as will enhance the wet strength of the base to a value many times that of the paper base used as the starting material. A paper so reinforced against the disintegrating action of water may be prepared by impregnating an absorptive paper base, for instance, a waterleaf paper base such as is customarily prepared for use as toweling, with a comparative dilute solution of cellulose ether, for instance, one of ½% to 2% cellulose ether content, squeezing the impregnated base to an ether content of about ½% to 2%, based on the dry weight of the paper base, and then precipitating the cellulose ether from solution in situ in the base. The impregnation with the dilute ether solution may be performed by passing the paper base through a bath of the ether solution and the subsequent precipitation of the ether from solution may be performed by passing the impregnated base, squeezed to the desired ether content, through a bath of suitable precipitant solution. If desired, suitable so-called wetting-out agents may be added to the ether solution or incorporated into the paper base to promote the influx of the solution into the paper base as well as to increase the rate of water influx into the finished paper sheet. The dried paper sheet of high absorbency and wet strength is serviceable to great advantage for such purposes as toweling, napkins, handkerchiefs, diapers, or the like. In preparing the cellulose ether solution of the desired dilution, it is necessary to use strongly alkaline water such as caustic soda solution of 5% to 6% strength in order to avoid premature and undesirable precipitation of the cellulose ether from solution. Accordingly, the originally prepared ether solution of about 8% cellulose ether content should be diluted with such a caustic soda solution to the desired cellulose ether content, say, ½% to 2% desired when producing papers possessed of both high wet strength and high absorbency, as hereinbefore described.

The reason why cellulose ethers of the kind herein described can be used successfully in producing absorbent papers of high wet strength is that they are not water-repellent as are cellulose derivatives of the nature of cellulose nitrate and cellulose acetate. On the contrary, they absorb water and are permeable to water to an appreciable extent, in fact, to as good if not better extent than cellulose regenerated from viscose. By limiting the amount of cellulose ether introduced uniformly throughout the paper base, only thin films of cellulose ether are deposited on the cellulose fiber constituting the paper base. These thin films are adequate for the purpose of integrating the fibers tenaciously against rupture by water and, by virtue of their thinness, water absorbency and water permeability, permit a ready diffusion of water not only into the pores and voids of the paper but also directly therethrough into the cellulose fibers themselves, wherefore the paper base treated with the cellulose ether is substantially as good a water imbiber and absorber as the waterleaf paper base used as the starting material. So far as I am aware, I am the first to recognize that the capabilities of cellulose ethers of the class herein described in absorbing water and in permitting water to diffuse therethrough can be put to play in making absorptive papers of high wet strength without running into those problems incident to the use of viscose in the same connection.

Rather than introducing the cellulose ether substantially uniformly throughout a paper base, as hereinbefore described, in producing absorbent papers of high wet strength, it is possible to apply the ether solution locally, as along closely spaced criss-cross lines, to the paper. I regard this sort of practice, however, as being less desirable in that for the realization of a given overall wet strength in the paper, it is necessary to work with more concentrated ether solutions such as tend to obstruct locally the pores and interstices of the paper as well as to impart a non-uniform feel or harshness to the paper.

As already indicated, the papers of the present invention containing a hydroxy ether of cellulose may be advantageously treated to acquire increased softness, smoothness and pliancy. Such a treatment may be applied to papers of various characteristics made in accordance with the present invention. Thus, when the papers of the present invention are of high absorbency, porosity and wet strength, they may be glycerinated to good advantage to a glycerine content of, say, up to about 15%, based on the dry weight of the paper, and thereby be put in a softer, smoother and more pliant condition without impairment of their water-absorbing capabilities. To this end, they may be glycerinated with an aqueous solution of glycerine and then dried, such glycerination being accomplished either before or after the paper containing the precipitated hydroxy ether of cellulose has been dried. When glycerination is performed on the dried paper containing the precipitated hydroxy ether of cellulose, substantially anhydrous glycerine may be squeezed into the paper in the desired amount so as to avoid the necessity of redrying the paper. Other polyhydric alcohols, such as ethylene glycol, or solutions of water-soluble soaps, may take the place of glycerine, but I prefer to use glycerine because of its comparatively low cost and high effectiveness for the purpose in view.

I claim:—

1. Paper of high absorbency, porosity, and wet strength, containing a hydroxy ether of cellulose distributed substantially uniformly throughout its body only as thin films deposited on and integrating its fibers, said ether being present in such amount as not to detract appreciably from the porosity of the paper base.

2. Paper of high absorbency, porosity, and wet strength, containing a hydroxy alkyl ether of cellulose distributed substantially uniformly throughout its body only as thin films deposited on and integrating its fibers, said ether being present in such amount as not to detract appreciably from the porosity of the paper base.

3. Paper of high absorbency, porosity, and wet strength, containing the hydroxy ethyl ether of cellulose distributed in the amount of about ½% to 2% substantially uniformly throughout its body only as thin films deposited on and integrating its fibers.

4. Glycerinated paper of high absorbency, porosity, and wet strength, containing a hydroxy alkyl ether of cellulose distributed substantially uniformly throughout its body only as thin films deposited on and integrating its fibers, said ether being present in such amount as not to detract appreciably from the porosity of the paper base.

5. A method of preparing absorptive paper products of high wet strength, which comprises preparing a solution of a hydroxy ether of cellulose of about ½% to 2% strength in an aqueous solution of caustic soda, impregnating an absorptive paper base substantially uniformly throughout its body with an excessive amount of such solution, removing excess solution from the impregnated base to leave solution in such amount as to deposit only thin films of the ether on the fibers, and precipitating the ether from solution as thin films on the fibers of substantially only the body of said base.

6. A method of preparing absorptive paper products of high wet strength, which comprises preparing a dilute solution of a hydroxy alkyl ether of cellulose in an aqueous solution of caustic soda, impregnating an absorptive paper base substantially uniformly throughout its body with an excessive amount of such solution, removing excess solution from the impregnated base to leave solution in such amount as to deposit not more than about ½% to 2% of the ether as thin films on the fibers, and precipitating the ether from solution as thin films on the fibers of substantially only the body of said base.

GEORGE A. RICHTER.